(12) United States Patent
Kim et al.

(10) Patent No.: US 12,380,558 B2
(45) Date of Patent: Aug. 5, 2025

(54) METHOD FOR DIFFERENTIATING RETINAL LAYERS IN OCT IMAGE

(71) Applicant: HUVITZ CO., LTD., Anyang-si (KR)

(72) Inventors: Hyoung Uk Kim, Anyang-si (KR); Seong Yeol Park, Anyang-si (KR)

(73) Assignee: HUVITZ CO., LTD., Anyang-si (KR)

( * ) Notice: Subject to any disclaimer, the term of this patent is extended or adjusted under 35 U.S.C. 154(b) by 454 days.

(21) Appl. No.: 17/966,628

(22) Filed: Oct. 14, 2022

(65) Prior Publication Data
US 2023/0137102 A1    May 4, 2023

(30) Foreign Application Priority Data
Oct. 29, 2021  (KR) .......................... 10-2021-0146595

(51) Int. Cl.
*G06T 7/00*    (2017.01)
*G06T 7/13*    (2017.01)

(52) U.S. Cl.
CPC .............. *G06T 7/0012* (2013.01); *G06T 7/13* (2017.01); *G06T 2207/10101* (2013.01); *G06T 2207/20081* (2013.01); *G06T 2207/20084* (2013.01); *G06T 2207/30041* (2013.01)

(58) Field of Classification Search
CPC ..................... G06T 7/0012; G06T 7/13; G06T 2207/10101; G06T 227/20081;
(Continued)

(56) References Cited

U.S. PATENT DOCUMENTS 9,589,346 B2    3/2017    Farsiu et al.
10,123,689 B2   11/2018   Jia et al.
(Continued)

FOREIGN PATENT DOCUMENTS

KR    10-2014-0068346 A    6/2014
KR    10-2019-0128292 A    11/2019

OTHER PUBLICATIONS

European search report for counterpart EP application No. 22201045.6, dated Apr. 3, 2023.
(Continued)

*Primary Examiner* — Stephen R Koziol
*Assistant Examiner* — Michael Kim Maiden
(74) *Attorney, Agent, or Firm* — United One Law Group LLC; Kongsik Kim; Jhongwoo Peck (57) ABSTRACT

A method for differentiating retinal layers includes obtaining an optical coherence tomography retinal layer image of an eye to be examined and inputting it into a deep neural network, calculating probability P that each pixel is included in each layer from the inputted layer image, calculating probability P1(x,y) that a pixel is in or above (k−1)-th layer and probability P2(x,y) that the pixel is in or below k-th layer from probabilities P(x,y) that the pixel is included in each layer, calculating probability $F_{k-1,k}(x,y)$ that the pixel becomes a boundary line between the (k−1)-th layer and the k-th layer from P1(x,y) and P2(x,y), obtaining a node cost $C_{k-1,k}(x,y)$ of the pixel by multiplying $F_{k-1,k}(x,y)$ with an image brightness change ΔI at the pixel, and determining the boundary line between the (k−1)-th and k-th layers by connecting coordinates (x,y) of the pixels where $C_{k-1,k}(x,y)$ calculated for each position x is the maximum.

4 Claims, 8 Drawing Sheets

(58) Field of Classification Search
CPC . G06T 2207/20084; G06T 2207/30041; G06T 7/12; G06T 7/11; A61B 3/102; A61B 3/0025; A61B 3/1225; G16H 30/40; G16H 50/20
See application file for complete search history.

(56) References Cited

U.S. PATENT DOCUMENTS

| | | |
|---|---|---|
| 10,169,864 B1 | 1/2019 | Bagherinia et al. |
| 2017/0119242 A1 | 5/2017 | Jia et al. |
| 2018/0192870 A1* | 7/2018 | Inao .................. G06T 5/50 |

OTHER PUBLICATIONS

Fang et al., "Automatic segmentation of nine retinal layer boundaries in OCT images of non-exudative AMD patients using deep learning and graph search," Biomedical Optics Express, vol. 8, No. 5, pp. 2732-2744, May 31, 2017, Optical Society of America.
Ben-Cohen et al., "Retinal layers segmentation using Fully Convolutional Network in OCT images," RSIP Vision, pp. 1-8, 2017.
Lang et al., "Retinal layer segmentation of macular OCT images using boundary classification," Biomedical Optics Express, vol. 4, No. 7, pp. 1133-1152, Jun. 14, 2013, Optical Society of America.
Monemian et al., "Analysis of a Novel Segmentation Algorithm for Optical Coherence Tomography Images Based on Pixels Intensity Correlations," IEEE Transactions on Instrumentation and Measurement, vol. 70, pp. 1-12, Aug. 17, 2020, IEEE, USA.

* cited by examiner

METHOD FOR DIFFERENTIATING RETINAL LAYERS IN OCT IMAGE

CROSS-REFERENCE TO RELATED APPLICATION

This application claims priority to Korean Patent Application No. 10-2021-0146595 filed on Oct. 29, 2021, which is incorporated herein by reference in its entirety.

TECHNICAL FIELD

The present disclosure relates to a method for differentiating retinal layers in an OCT image, and more particularly, to a method for differentiating retinal layers that can reliably differentiate retinal layer regions from an OCT retinal cross-sectional image by taking into account the anatomical hierarchical relationship between the retinal layers.

RELATED ART

For ophthalmic examinations such as glaucoma and retinal diseases or ophthalmic surgery such as corneal surgery, an optical coherence tomography (OCT) apparatus is used to non-invasively capture three-dimensional cross-sectional images of a patient's eyes. An optical coherence tomography (OCT) apparatus transmits measurement light (e.g., near-infrared light) through an object to be examined (e.g., retina), detects reflected light (scattered light) reflected from the inside and each layer of the object to be examined, and obtains an internal cross-sectional image of the object to be examined.

In a retinal cross-sectional image obtained with an OCT apparatus, various morphological deformations and abrupt curvature changes may appear in each layer of the retinal cross-sectional image, according to the characteristics of the eye (e.g., high myopia, etc.), the retinal regions (e.g., macula, optic nerve head) included in the corresponding image, lesions such as neovascularization, hemorrhage, and edema caused by ophthalmic diseases such as macular degeneration (AMD), diabetic retinopathy, etc. On the other hand, the hierarchical relationship of retinal layers, which are located in the order of the vitreous body, the nerve fiber layer (NFL), the ganglion cell layer (GCL), the inner plexiform layer (IPL), the outer plexiform layer (OPL), the outer nuclear layer (ONL), the retinal pigment epithelium layer (RPE), and the choroid layer in the direction of the depth of the retinal layers (in the direction of the axial scan) at a particular point in the retina, remains unchanged. Therefore, by detecting the position of each layer of the retina in the obtained OCT retinal cross-sectional image, the condition of the retina can be diagnosed.

Figure 1:
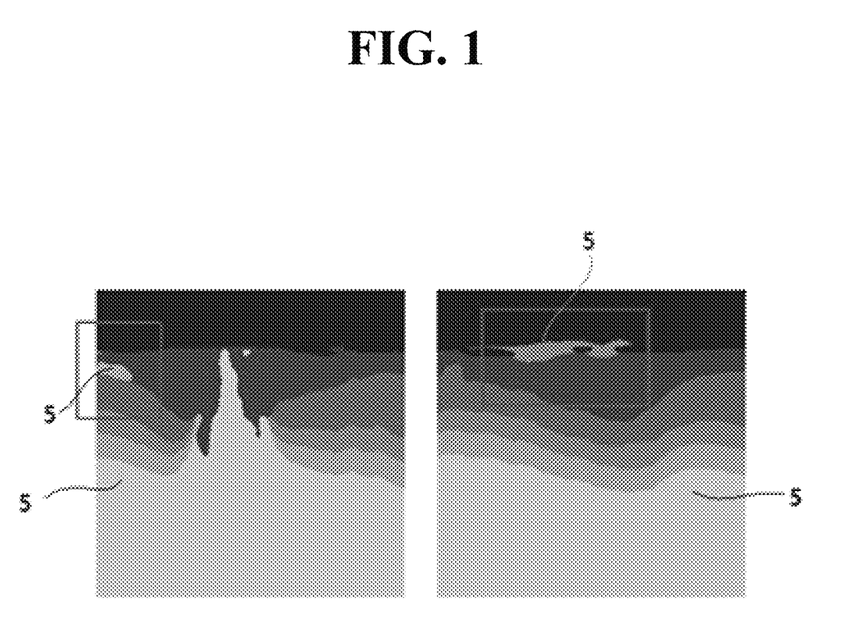
FIG. 1 shows images of examples in which erroneous retinal layer prediction results are obtained by image segmentation using a conventional deep neural network.

In order to detect the position of each layer of the retina from the OCT retinal cross-sectional image, attempts have been made to use a deep neural network trained by artificial intelligence technology. Since image segmentation performed by a typical deep neural network predicts the probability that a particular pixel in total pixels that constitute an OCT image is classified into a particular layer region, it does not take into account the anatomical hierarchical relationship between retinal layers. For example, in an OCT retinal cross-sectional image, there may arise an error in which a pixel located below the pixels that have been predicted to be the retinal pigment epithelium layer (RPE) is predicted to be the nerve fiber layer (NFL). In other words, image segmentation performed by a deep neural network may produce erroneous retinal layer prediction results that do not match the anatomical hierarchical relationship between retinal layers. For example, as shown in FIG. 1, the same layer (e.g., the choroid layer 5) might appear divided above and below. In addition, errors such as predicting a pixel included in the nerve fiber layer (NFL) as another retinal layer rather than the NFL in the OCT image may occur. In the prediction probability map outputted as a result of the determination by the deep neural network, if a particular pixel is predicted as a retinal layer that is different from the actual one or is predicted not to match the anatomical positional relationship between the retinal layers, especially in the depth direction of the retina, the accuracy of the boundary lines between the retinal layers obtained from the determination result of the deep neural network is greatly reduced.

As such, in segmenting a conventional OCT retinal cross-sectional image, each layer inside the retina was differentiated using local feature differences such as changes in the intensity of reflected light reflected from each layer. For this purpose, a graph theory-based optimization algorithm or the like was used. However, in OCT retinal cross-sectional images, since not only is it difficult to accurately distinguish each layer with only differences in local brightness, but also the position of each layer can change depending on the condition of the retina, there is a need for a more accurate and reliable method for differentiating the retinal layers.

PRIOR ART LITERATURE

Korean Patent Application Publication No. 10-2019-0128292 (Korean Patent Application No. 10-2018-0052271)
Korean Patent Application Publication No. 10-2014-0068346 (Korean Patent Application No. 10-2012-0135683)
U.S. Pat. No. 9,589,346
U.S. Pat. No. 10,123,689

SUMMARY

It is an object of the present disclosure to provide a method for differentiating retinal layers that can reliably differentiate retinal layer regions from an OCT retinal cross-sectional image by taking into account the anatomical hierarchical relationship between the retinal layers.

It is another object of the present disclosure to provide a method for differentiating retinal layers that can accurately diagnose the degree of progression of various retinal diseases such as diabetic retinopathy and glaucoma by measuring the thickness of the retinal layers differentiated in the OCT retinal cross-sectional image.

In order to achieve the above objects, the present disclosure provides a method of differentiating retinal layers, including: step S20 of obtaining an optical coherence tomography (OCT) retinal layer image of an eye to be examined and inputting it into a deep neural network; step S22 of calculating a probability P that each pixel is included in each layer from the inputted layer image; step S24 of calculating a probability $P1(x,y)$ that a pixel at the coordinate $(x,y)$ is in or above $(k-1)$-th layer and a probability $P2(x,y)$ that the pixel is in or below k-th layer from probabilities $P(x,y)$ that the pixel at the coordinate $(x,y)$ is included in each layer; step S26 of calculating a probability $F_{k-1,k}(x,y)$ that the pixel becomes a boundary line between the $(k-1)$-th layer and the k-th layer from the probability $P1(x,y)$ that the pixel is in or above the $(k-1)$-th layer and the probability $P2(x,y)$ that the pixel is in or below the k-th layer; step S28 of obtaining a node cost $C_{k-1,k}(x,y)$ of the pixel by multiplying the probability $F_{k-1,k}(x,y)$ that the pixel at the position (x,y) becomes the boundary line between the (k−1)-th layer and the k-th layer with an image brightness change ΔI at the pixel; and step S30 of determining the boundary line between the (k−1)-th layer and the k-th layer by connecting the coordinates (x, y) of the pixels where the node cost $C_{k-1,k}(x,y)$ calculated for each position x is the maximum.

The method for differentiating retinal layers in an OCT image in accordance with the present disclosure can reliably differentiate retinal layer regions by taking into account the anatomical hierarchical relationship between the retinal layers, and can accurately diagnose the degree of progression of various retinal diseases such as diabetic retinopathy and glaucoma by measuring the thickness of the retinal layers differentiated.

DETAILED DESCRIPTION

Hereinafter, the present disclosure will be described in detail with reference to the accompanying drawings.

According to the present disclosure, an image of the retina obtained with optical coherence tomography (OCT), for example, a cross-sectional image of the macula, optic nerve head (ONH, optic disc), etc., is inputted into a deep neural network trained with an artificial intelligence deep learning. Then, the probability that a particular position (pixel) in the cross-sectional image corresponds to a particular layer of the retina is obtained. The obtained probability map of the retinal layers is used to obtain boundary lines between the retinal layers.

Figure 2A:
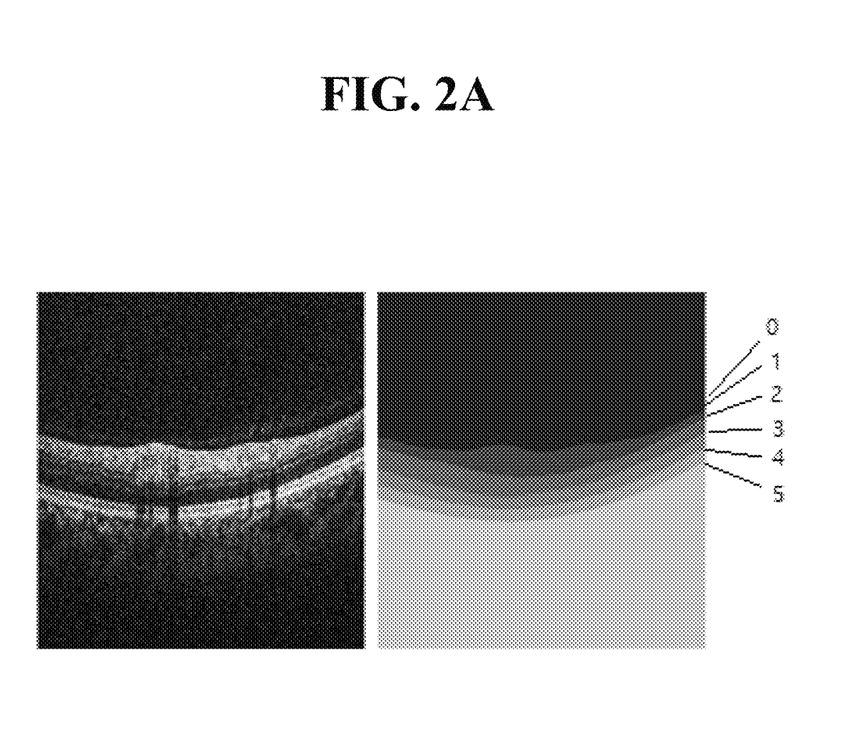
FIGS. 2A and 2B are views showing one example of an OCT retinal cross-sectional image and a label image for constructing a deep neural network, respectively.
Figure 2B:
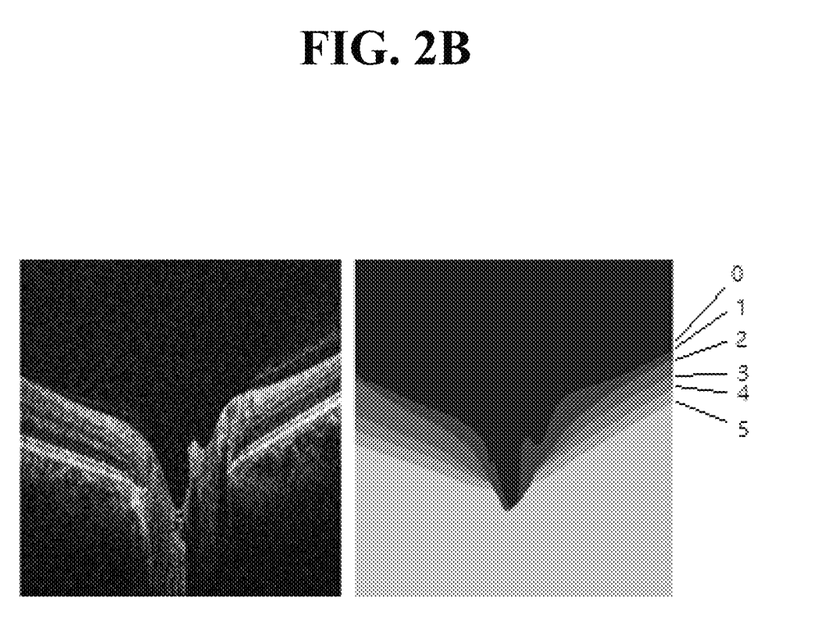

The deep neural network that can be used in the present disclosure is an artificial intelligence software that is trained with a large number of training data sets consisting of (i) OCT retinal cross-sectional images obtained at various positions of the retina and (ii) boundary line data of the retinal layers (hereinafter referred to as a 'label image') produced by experts such as ophthalmologists for the OCT retinal cross-sectional images. Thereby, the deep neural network analyzes the OCT retinal cross-sectional images. For example, a label image having the same size as an OCT image is segmented along the boundary line of each layer, and an index value of a corresponding retinal layer is assigned to every pixel in a region within the retina of the OCT image. FIGS. 2A and 2B are views showing one example of an OCT retinal cross-sectional image and a label image for constructing a deep neural network. FIG. 2A shows an OCT cross-sectional image and a label image of the macular region. FIG. 2B shows an OCT cross-sectional image and a label image of the optic nerve head (ONH) region. In FIGS. 2A and 2b, "0" represents the vitreous layer, "1" represents the nerve fiber layer (NFL), "2" represents the ganglion cell layer (GCL), the inner plexiform layer (IPL), and the outer plexiform layer (OPL), "3" represents the outer nuclear layer (ONL), "4" represents the retinal pigment epithelium (RPE), and "5" represents the choroid layer.

Figure 3:
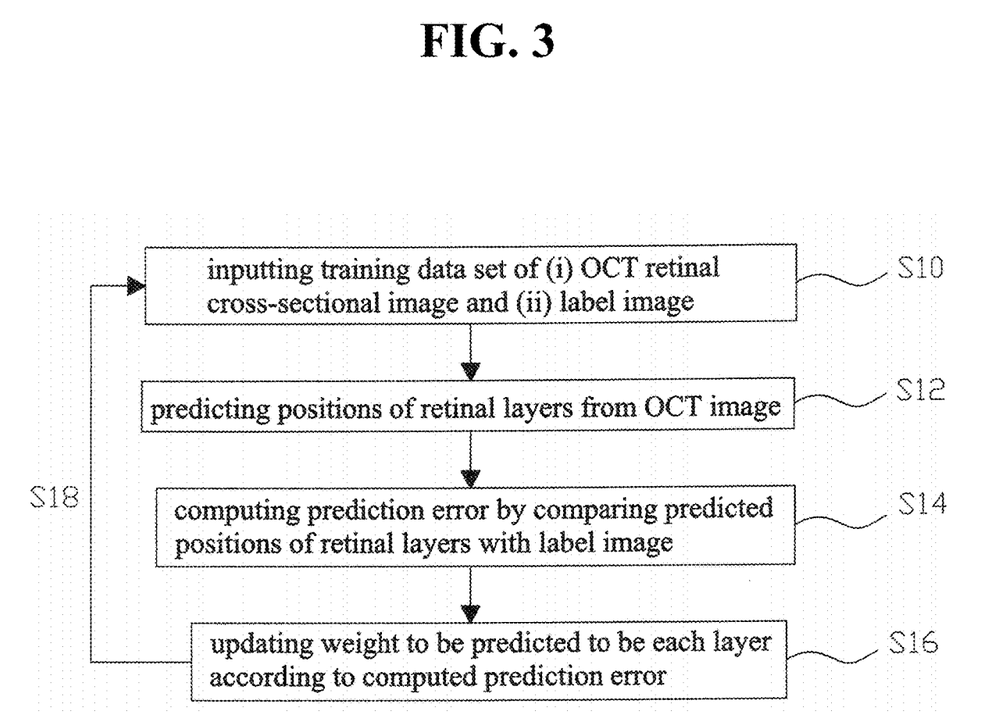
FIG. 3 is a flowchart for describing a training process of a deep neural network for retinal layer differentiation.

FIG. 3 is a flowchart for describing a training process of a deep neural network for retinal layer differentiation. As shown in FIG. 3, in order to obtain a deep neural network on the basis of an artificial intelligence deep learning, first, a training data set of (i) an OCT retinal cross-sectional image and (ii) a label image created for the OCT retinal cross-sectional image is inputted into the deep neural network (a calculation device) such as an artificial intelligence computer (S10). The deep neural network predicts the positions of the retinal layers from the OCT image (S12), for example, by using the difference in brightness of each pixel, specifically, by extracting and learning various features such as brightness distribution or brightness difference of image data included in each retinal layer region. For example, the deep neural network outputs 'a probability map of N channels' corresponding to N retinal layers (for example, six layers in FIGS. 2A and 2B), for example, by predicting a probability value that each pixel of the image is classified into the k-th retinal layer among the N retinal layers. Next, a prediction error (loss) is computed by comparing the predicted positions of the retinal layers (i.e., the probability map) with the label image (S14), and the weight to be predicted to be each layer is updated according to the computed prediction error (S16). In one embodiment of the present disclosure, with respect to a particular pixel, the prediction error (loss) is the magnitude of the probability (falsely) predicted to be a retinal layer that is different from the (true) layer in the label image. A cross-entropy loss function is calculated with the prediction error, and the weight of a convolution filter corresponding to each layer is updated with the cross-entropy loss function by a backpropagation algorithm. In the training stage of the deep neural network, learning is repeatedly performed so that the result predicted with the training OCT image gets similar to the (true) retinal layer region distribution in the label image (S18). The learning is completed when the loss converges to a lowest value, for example, when the prediction error becomes less than or equal to a predetermined value.

Figure 4:
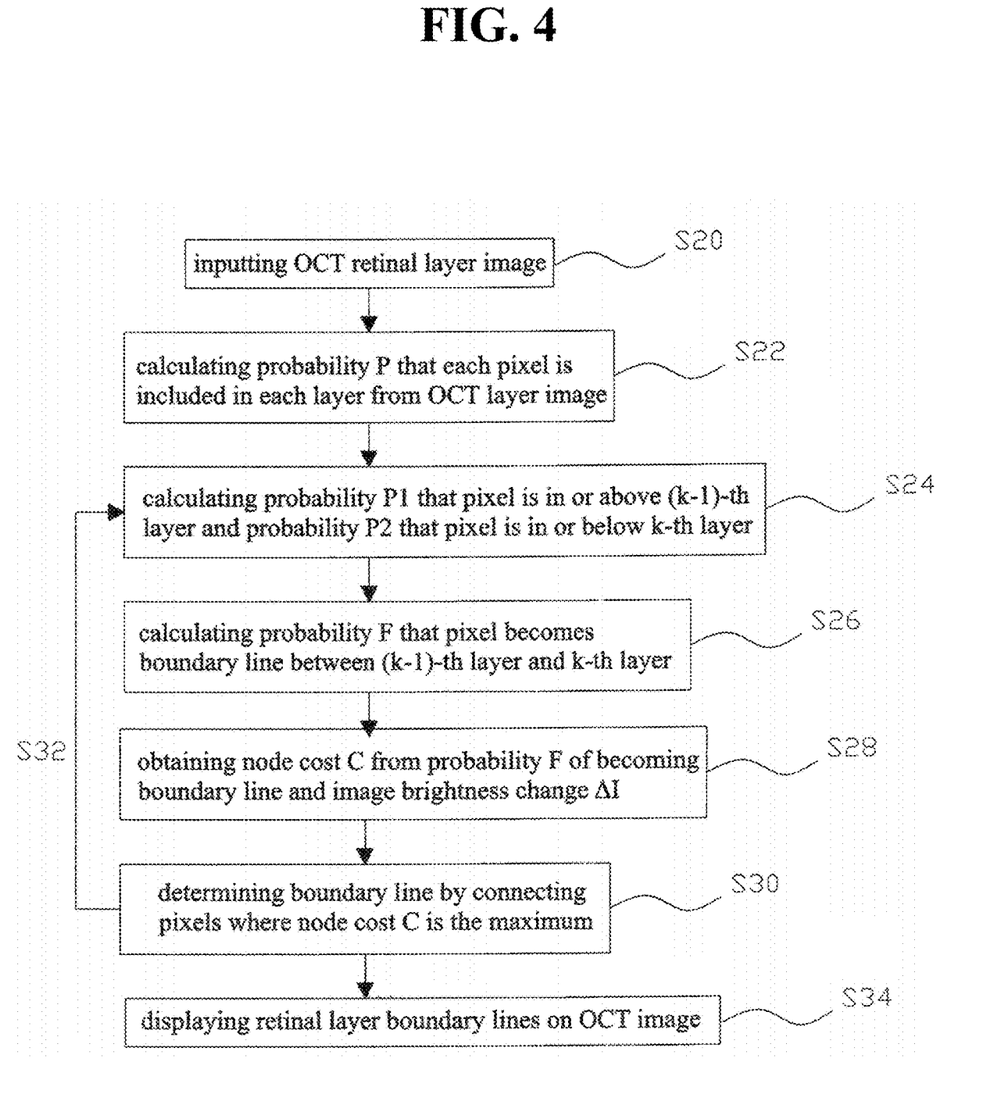
FIG. 4 is a flowchart for describing a retinal layer differentiation process of an OCT image using a deep neural network.

FIG. 4 is a flowchart for describing a retinal layer differentiation process of an OCT image using a deep neural network. As shown in FIG. 4, for the retinal layer differentiation of the OCT image, an OCT retinal layer image of the eye to be examined is first obtained and inputted into the deep neural network (S20). Then, from the inputted OCT layer image, a probability P that each pixel is included in each layer is calculated (S22). Specifically, by using the deep neural network, a retinal layer probability map of N channels is produced in the step of calculating the probability for each pixel in the OCT image to be included in a particular retinal layer. At this time, in the retinal layer probability map of N channels, let the probabilities that the pixel at the coordinates (x,y) is included in the (k−1)-th layer and the k-th layer be $P_{k-1}$ (x,y) and $P_k$(x,y), respectively. In other words, by using a deep neural network trained with a plurality of training data (pairs of OCT images and label images), a prediction probability map of the retinal layer regions, which shows the probability of being classified into each retinal layer at the pixel points of the OCT image, is obtained.

Figure 5:
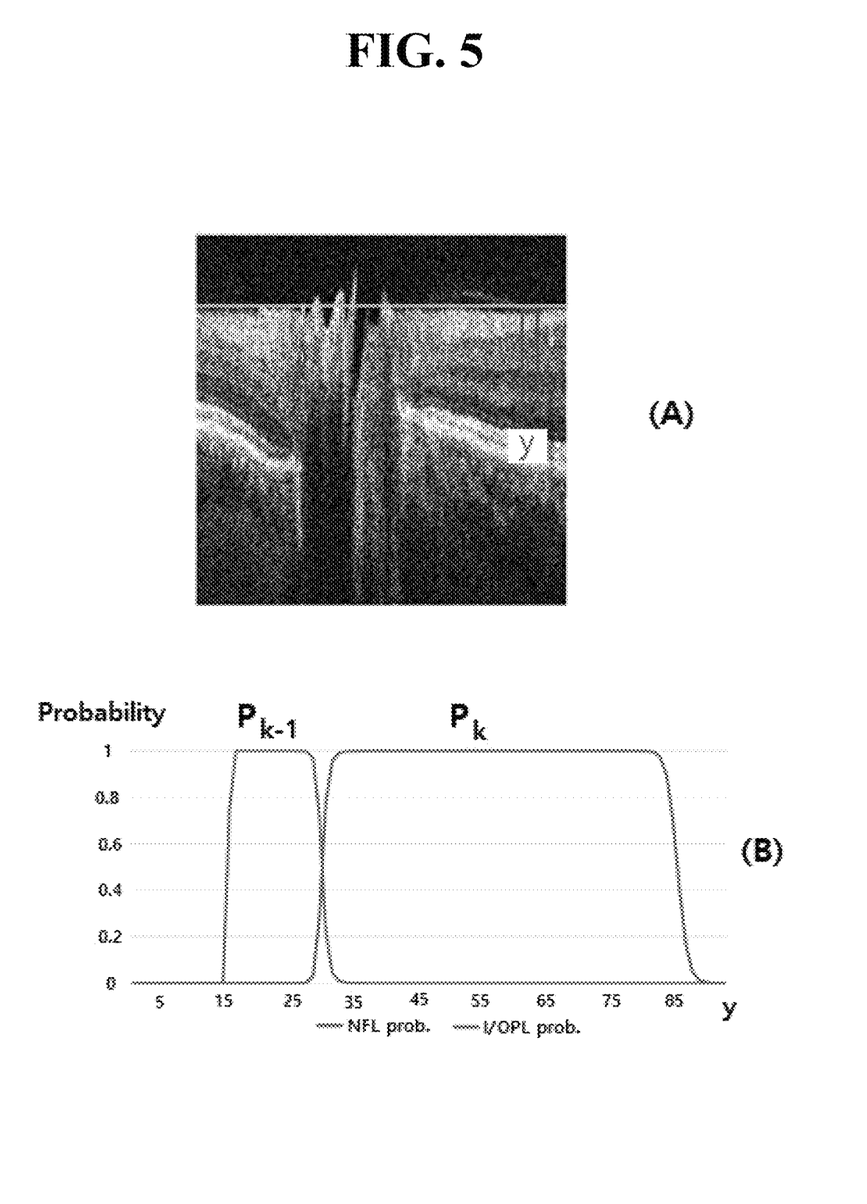
FIG. 5 is a retinal position where the deep neural network in accordance with the present disclosure analyzes an OCT image, and a graph showing changes in the probability of a retinal layer according to the retinal position (depth)

FIG. 5 is a retinal position where the deep neural network in accordance with the present disclosure analyzes an OCT image (FIG. 5 (A)), and a graph showing changes in the probability of a retinal layer according to the retinal position (depth) (FIG. 5 (B)). As shown in FIG. 5 (A), if the y-coordinate of the image is increased, i.e., moved in the observation axial direction, from a pixel position inside the (k−1)-th layer, as shown in FIG. 5 (B), $P_{k-1}$ decreases and $P_k$ increases as it gets closer to the boundary line between the layers. FIG. 5 (B) shows that the probability changes from the (k−1)-th layer (e.g., the NFL layer) to the k-th layer (e.g., the composite layer consisting of GCL & IPL & OPL) according to the retinal position (depth), for example. When proceeding in the depth direction (increase in the y-axis coordinate) from a particular point on the retina, in which the probability changes according to the pixel position, a boundary point between successive layers becomes a region in which the prediction probability of being classified into an upper layer decreases and the prediction probability of being classified into a lower layer increases.

Referring back to FIG. 4, in the next step, from the probabilities P(x,y) that a particular pixel at the coordinate (x,y) is included in each layer, a probability P1(x,y) that the pixel is in or above the (k−1)-th layer (namely, upper layers) and a probability P2(x,y) that the pixel is in or below the k-th layer (namely, lower layers) are calculated (S24). In order to find a boundary line that differentiates particular retinal layers ((k−1)-th and k-th), let the set of the (k−1)-th layer and the layers located at the top (upper) of that layer in the anatomical hierarchical relationship of the retinal layers be $C_{uppers}$. Also, let the set of the k-th layer and the layers located at the bottom (lower) of that layer in the anatomical hierarchical relationship of the retinal layers be $C_{lowers}$. From the results of the deep neural network, let the sum of the probabilities that the pixel point of the coordinates (x,y) is classified into one of the retinal layers $C_{uppers}$ (which are located above the boundary line to be obtained) be a "likelihood that the pixel will be located at the top of (namely, above) the boundary line ($L_1$)." In the same way, let the sum of the probabilities that the pixel point of the coordinates (x,y) is classified into one of the retinal layers $C_{lowers}$ (which are located below the boundary line to be obtained) be a "likelihood that the pixel will be located at the bottom of (namely, below) the boundary line ($L_2$)." For example, the "likelihood that the pixel of the coordinates (x,y) will be located at the top of the boundary line ($L_1$)" and the "likelihood that the pixel of the coordinates (x,y) will be located at the bottom of the boundary line ($L_2$)" can be calculated by Equation 1 below (where '1' represents the layer number). That is, the likelihood of being separated by the boundary line between the layers is calculated using the anatomical hierarchical relationship of the retinal layers and by using the predicted probability map.

$$L_1(x,y) \Sigma_{i \in c_{uppers}} Pl(x,y), L_2(x,y) = \Sigma_{i \in c_{lowers}} pl(x,y) \quad \text{Equation 1:}$$

From the likelihoods $L_1$ and $L_2$, the probability P1 that the pixel point of the coordinates (x,y) is located above the boundary line and the probability P2 that it is located below the boundary line can be obtained by Equation 2 below. That is, by using the likelihoods, a probability distribution for all the pixels located on the A-scan line of the OCT image (a column lime in the OCT 2D image prepared by A-scan and B-scan) is newly calculated.

$$P1(x, y) = \frac{L1(x, y)}{L1(x, y) + L2(x, y)}, \quad \text{Equation 2}$$

$$P2(x, y) = \frac{L2(x, y)}{L1(x, y) + L2(x, y)}$$

Next, from the probability P1(x,y) that the pixel is in or before (above) the (k−1)-th layer and the probability P2(x,y) that the pixel is in or after (below) the k-th layer, the probability $F_{k-1,k}$(x,y) that the pixel becomes the boundary line between the (k−1)-th layer and the k-th layer is calculated (S26). The magnitude of the probability P1 decreases as the pixel point of the coordinates (x,y) approaches to the boundary line from the layer region above the boundary line and the distance to the below layer region gets closer. Conversely, the magnitude of the probability P2 decreases as the pixel point approaches to the boundary line from the layer region below the boundary line. That is, the closer the pixel of the coordinates (x,y) is to the boundary line, the uncertainty of the predicting as the upper layers or the below layers, for example, proportionally, increases. The magnitude of the uncertainty can be quantified into an entropy value $H_{k-1,k}$(x,y) as shown in Equation 3 below from the probabilities P1 and P2 (In Equation 3 below, Pc corresponds to the probability P1 of being upper layers and the probability P2 of being below layers, and c is an index corresponding to 1 or 2).

$$H_{k-1,k}(x,y) = -\Sigma_c Pc(x,y) ln(Pc(x,y)) \quad \text{Equation 3:}$$

Figure 6:
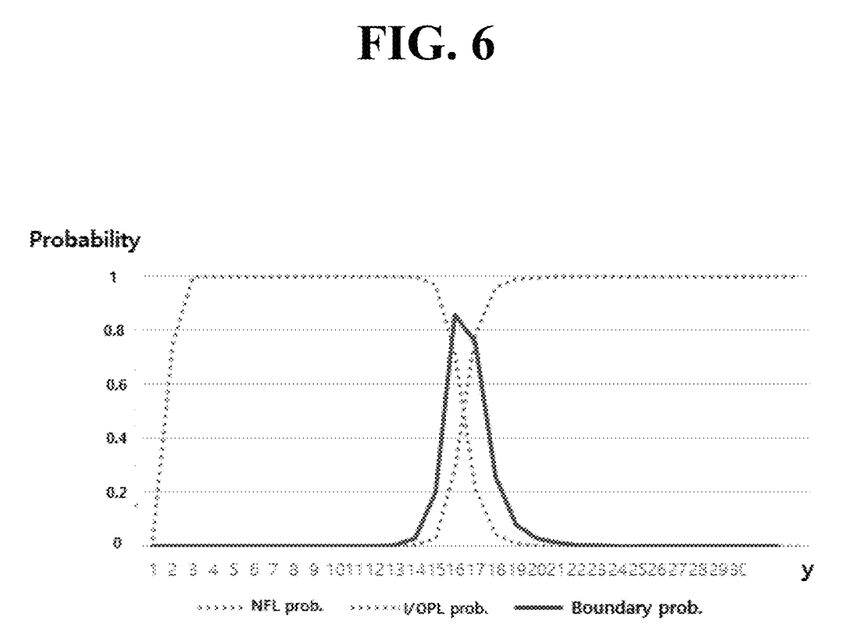
FIG. 6 is a graph showing the probability changes $F_{k-1,k}$ (x=t, y) for the deep neural network in accordance with the present disclosure to become a boundary line between retinal layers according to the position (depth) of the pixel in the OCT image.

In optical coherence tomography (OCT), a cross-sectional image of the retina is obtained by (i) continuously acquiring A-scan image data which is obtained by scanning in the depth direction (axial direction) of the retina at a particular point on the retina (namely, A-scan) and (ii) by moving the position of the A-scan beam in a fast scan direction (namely, B-scan). Therefore, in obtaining the entropy, the anatomical vertical hierarchical relationship of the retinal layers is established only for the A-scan image. An OCT image includes a plurality of pixels on the y-axis for a x-coordinate position, and the entropy values are assigned to the plurality of pixels. From the entropy values, a probability distribution $F_{k-1,k}$ (x=t, y) in which each pixel point (x,y) is included in the boundary line between the (k−1)-th layer and the k-th layer can be calculated by Equation 4 below. FIG. 6 is a graph showing the probability changes $F_{k-1,k}$ (x=t, y) for becoming a boundary line between retinal layers according to the pixel position (depth) of the coordinates (x=t, y) in the OCT image.

$$F_{k-1,k}(x = t, y) = \frac{H_{k-1,k}(x = t, y)}{\sum_{r=1}^{D} H_{k-1,k}(x = t, y = r)} = \\ \frac{\sum_c Pc(x = t, y) \ln(Pc(x = t, y))}{\sum_{r=1}^{D} \sum_c Pc(x = t, y = r) \ln(Pc(x = t, y = r))} \quad \text{Equation 4}$$

Next, the probability $F_{k-1,k}$(x,y) of becoming the boundary line between the (k−1)-th layer and the k-th layer for the pixel at the position (x,y) is multiplied with an image brightness change ΔI at the pixel to obtain a node cost $C_{k-1,k}(x,y)$ of the pixel at the position (x,y) (S28).

The boundary line between the retinal layers in the OCT image is a point at which the image brightness changes from a lower value to a higher value such as the boundary between the vitreous body and the NFL or changes in reverse such as the boundary between the NFL and I/OPL. Therefore, in order to calculate the retinal boundary lines, the brightness change in the depth direction (axial direction) of the retina is measured by the first-order differential value, and the probability F of becoming the boundary line obtained above is used as a weight. If the deep neural network erroneously predicts the probability of being a retinal layer at a particular pixel position being too low or erroneously predicts the pixel as a different layer, it is possible to compensate the error with the edge (change) feature of a local brightness change and to locate the boundary line at a point where the edge is large. Thereby, the accuracy of boundary line detection enhances. The brightness change (gradient) at the position (x,y) according to the position in the depth (axial) direction can be computed by Equation 5 below (where 'I' is the brightness value at the corresponding coordinate, and Δy represents the distance to the adjacent pixel).

$$\Delta I(X,Y)=I(x,y+\Delta y)-I(x,y) \quad \text{Equation 5:}$$

In the step of differentiating the retinal layers of the OCT image by using the probability distribution F of being the boundary lines, the OCT image can be considered as a graph, and each pixel of the image becomes a node that constitutes the graph. As shown in Equation 6 below, the probability F(x,y) of becoming the boundary line for the pixel of the coordinates (x,y) is set as a weight, and the image brightness change ΔI at the pixel is multiplied to the weight to obtain the node cost C.

$$C_{k-1,k}(x,y)=F_{k-1,k}(x,y)*\Delta I(x,y) \quad \text{Equation 6:}$$

Next, the boundary line between the (k−1)-th layer and the k-th layer is determined by connecting the coordinates (x, y) of the pixels where the node cost $C_{k-1,k}(x,y)$ calculated for each position x is the maximum (S30). The pixel node at the coordinates (x,y) is connected to pixels of the coordinate (x+1, y'), where the x coordinate is increased by 1 and the y coordinate is arbitrary, with unidirectional edges. As shown in Equation 7 below, the cost of the edge (E) connecting from the node at the coordinate (x,y) to the node at the coordinate (x', y') is the sum of the costs C(x,y) and C(x', y') at the both pixel nodes, and the sum is multiplied with a negative sign (namely, −1.0) for carrying out a lowest cost pathfinding.

$$E_{k-1,k}(x,y)\to(x',y')=(C_{k-1,k}(x,y)30C_{k-1,k}(x',y'))*-1.0 \quad \text{Equation 7:}$$

As shown in Equation 8 below, the boundary line of the retinal layers is determined by the set of edges that minimizes the sum of the costs of the edges connecting the nodes from the coordinate (x=0, y) where the image starts on the left side of the OCT image to the coordinate (x=width(w)−1, y) of the right end. The edges connect nodes while traversing from the left side to the right side of the OCT image.

$$\text{Minimize} \sum_{k=1}^{w-1} E_{k-1,k}(x-1, y) \to (x, y) \quad \text{Equation 8}$$

subject to: $y \in \{0, 1, \ldots h-1\}$, image size = (w, h)

In order to effectively implement the lowest cost pathfinding, techniques such as typical Dijkstra's algorithm and dynamic programming can be used. According to the present disclosure, the boundary line of the retinal layer can be determined by searching for the path having the minimum cost, by using the probability value of being the boundary line of each pixel as a weight.

Figure 7:
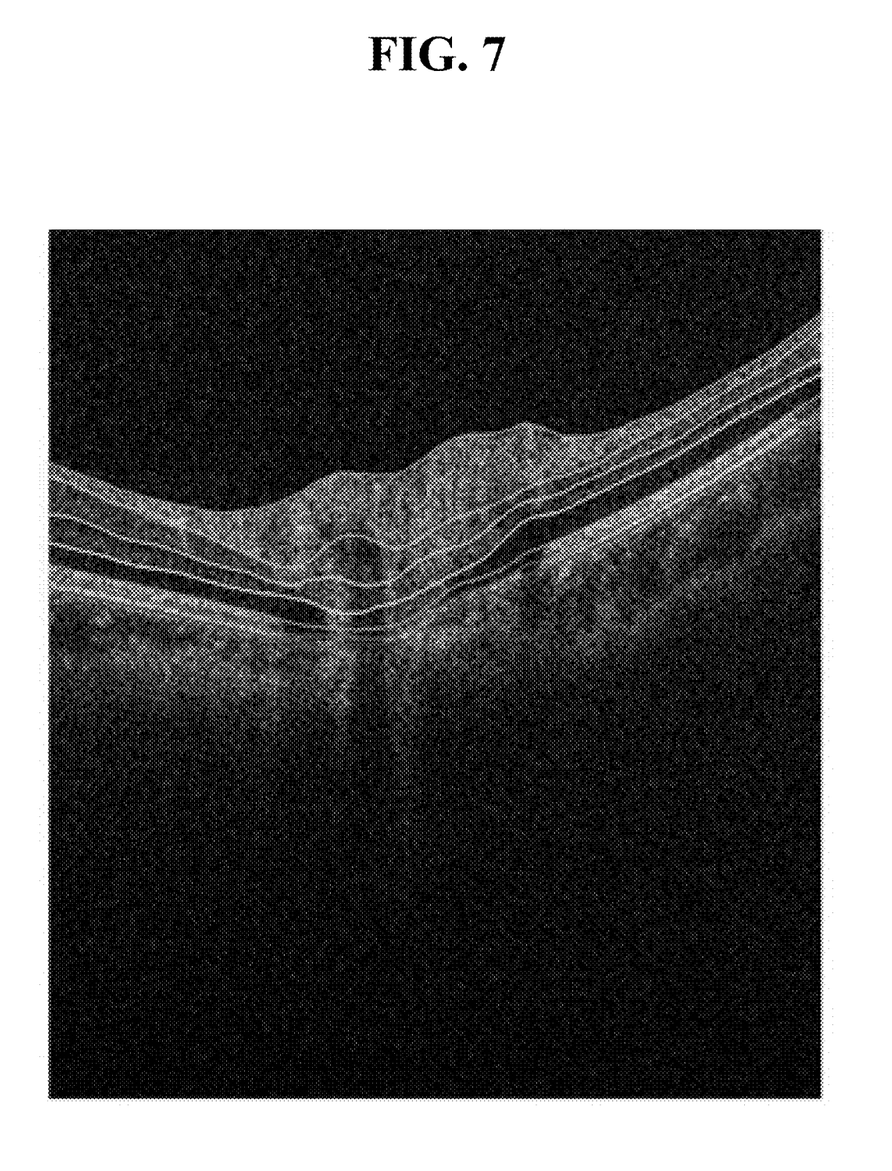
FIG. 7 is a view showing one example of an OCT image onto which retinal layer boundary lines are added with the method of the present disclosure.

If necessary, steps S24 to S30 are repeated in the same way as described above for all the boundary lines that differentiate the respective retinal layers in the OCT image to thereby determine all the boundary lines that differentiate the respective retinal layers (S32), and the determined retinal layer boundary lines are displayed on the OCT image (S34). FIG. 7 is a view showing one example of an OCT image onto which retinal layer boundary lines are added in this way, and six boundary lines are determined and illustrated in FIG. 7.

The deep neural network for retinal layer differentiation in the present disclosure is a convolutional network model in which as the input image passes through the convolutional filter and nonlinear activation function of each layer that constitutes the network in sequence, contextual features are extracted from the entire image while compressing the image dimension. After that, by subjecting to the step of restoring the image dimension, more local features extracted in the previous step are considered. Finally, it is implemented with an encoder-decoder type in the form of obtaining a probability map including predicted probability values for classifying each pixel into the retinal layers with the original input image dimension.

According to the present disclosure, the contextual features of the entire image are extracted by segmenting the image using the deep neural network of the convolutional network model. And this is utilized to perform semantic segmentation, reliable optical coherence tomography (OCT) angiography images can be obtained in the layer regions.

Although the present disclosure has been described with reference to example embodiments, the present disclosure is not limited to the embodiments described above. The scope of the following claims should be construed as broadest possible to encompass all modifications, equivalent constructions, and functions of the example embodiments.

What is claimed is:

1. A method of determining boundary lines between retinal layers, comprising:
   step S20 of obtaining an optical coherence tomography (OCT) retinal layer image of an eye to be examined and inputting it into a deep neural network;
   step S22 of calculating a probability P that each pixel is included in each layer from the inputted layer image;
   step S24 of calculating a probability P1(x, y) that a pixel at the coordinate (x, y) is in or above (k−1)-th layer and a probability P2(x, y) that the pixel is in or below k-th layer from probabilities P (x, y) that the pixel at the coordinate (x, y) is included in each layer, wherein the probability P1(x, y) and the probability P2(x, y) are calculated by steps of:
   calculating a likelihood $L_1$ that the pixel at position (x, y) is located above a boundary line between the (k−1)-th layer and the k-th layer, the likelihood $L_1$ being determined by summing probabilities, output by the deep neural network, that the pixel is classified as belonging to one of retinal layers $C_{uppers}$ above the boundary line, and a likelihood $L_2$ that the pixel is located below the boundary line, the likelihood $L_2$ being determined by summing probabilities, output by the deep neural network, that the pixel is classified as belonging to one of retinal layers $C_{lowers}$ below the boundary line, using Equation 1 below:

$$L_1(x,y) \Sigma_{i \in cuppers} Pl(x,y), L2(x,y) = \Sigma_{i \in clowers} pl(x,y) \qquad \text{Equation 1:}$$

obtaining the probability P1 and the probability P2 from the likelihood $L_1$ and the likelihood $L_2$ using Equation 2 below:

$$P1(x, y) = \frac{L1(x, y)}{L1(x, y) + L2(x, y)}, \qquad \text{Equation 2}$$

$$P2(x, y) = \frac{L2(x, y)}{L1(x, y) + L2(x, y)}.$$

step S26 of calculating a probability $F_{k-1,k}(x, y)$ that the pixel becomes a boundary line between the (k−1)-th layer and the k-th layer from the probability P1(x, y) that the pixel is in or above the (k−1)-th layer and the probability P2(x, y) that the pixel is in or below the k-th layer;

step S28 of obtaining a node cost $C_{k-1,k}(x, y)$ of the pixel by multiplying the probability $F_{k-1,k}(x, y)$ that the pixel at the position (x, y) becomes the boundary line between the (k−1)-th layer and the k-th layer with an image brightness change ΔI at the pixel; and step S30 of determining the boundary line between the (k−1)-th layer and the k-th layer by connecting the coordinates (x, y) of the pixels where the node cost $C_{k-1,k}(x, y)$ calculated for each position x is the maximum.

2. The method of claim 1, wherein the deep neural network is trained by:
  step S10 of inputting a training data set of (i) an OCT retinal cross-sectional image and (ii) a label image created for the OCT retinal cross-sectional image;
  step S12 of predicting positions of the retinal layers from the OCT image;
  step S14 of computing a prediction error (loss) by comparing the predicted positions of the retinal layers and the label image; and
  step S16 of updating a weight to be predicted for each layer according to the computed prediction error.

3. The method of claim 1, wherein the image brightness change ΔI at the pixel is computed by Equation 5 below, in which I is a brightness value at the corresponding coordinates, and Δy represents a distance to an adjacent pixel:

$$\Delta I(X,Y) = I(x, y+\Delta y) - I(x,y) \qquad \text{Equation 5:}$$

4. The method of claim 1, further comprising:
  a step S32 of determining all boundary lines that differentiate respective retinal layers by repeating steps S24 to S30 for all the boundary lines that differentiate the respective retinal layers in the OCT image.

* * * * *